United States Patent
Kangler

(10) Patent No.: US 7,258,105 B2
(45) Date of Patent: Aug. 21, 2007

(54) METHOD FOR VERIFICATION OF AT LEAST ONE GIVEN FUEL MIXTURE RATIO

(76) Inventor: Wolfram Kangler, Bachbugler Weg 9, Nittenau-Brunn (DE) 93149

( * ) Notice: Subject to any disclaimer, the term of this patent is extended or adjusted under 35 U.S.C. 154(b) by 0 days.

(21) Appl. No.: 11/249,492

(22) Filed: Oct. 14, 2005

(65) Prior Publication Data

US 2006/0081230 A1    Apr. 20, 2006

(30) Foreign Application Priority Data

Oct. 15, 2004    (DE)    ...... 10 2004 050 602

(51) Int. Cl.
*F02M 43/00*    (2006.01)
(52) U.S. Cl. ........ 123/434; 123/575; 73/118.1
(58) Field of Classification Search ........ 123/1 A, 123/1 R, 73 AD, 196 V, 196 S, 196 R, 434, 123/576, 577, 578; 73/118.1
See application file for complete search history.

(56) References Cited

U.S. PATENT DOCUMENTS

| | | | | |
|---|---|---|---|---|
| 4,995,367 A | * | 2/1991 | Yamauchi et al. | 123/494 |
| 5,101,799 A | * | 4/1992 | Davis et al. | 123/527 |
| 6,382,170 B1 | * | 5/2002 | Mang et al. | 123/196 A |
| 6,532,918 B1 | * | 3/2003 | Mang et al. | 123/73 AD |

\* cited by examiner

*Primary Examiner*—Willis R. Wolfe
*Assistant Examiner*—Johnny H. Hoang
(74) *Attorney, Agent, or Firm*—Hoffman, Wasson & Gitler, P.C.

(57) ABSTRACT

A fuel injection system during operation of an internal combustion engine with at least two separately stored fuel types is supplied with at least one first fuel type. With the supply of a second fuel type or with the change from the supply of the first fuel type to the second fuel type, the fuel volume conveyed by the injection system is determined and dependent thereon the presence of a given fuel mixture ratio is verified.

20 Claims, 1 Drawing Sheet

METHOD FOR VERIFICATION OF AT LEAST ONE GIVEN FUEL MIXTURE RATIO

BACKGROUND OF THE INVENTION

The present invention relates to a method for verification of at least one given fuel mixture ratio in a fuel injection system during operation of an internal combustion engine with at least two separately stored fuel types, wherein the injection system is supplied with at least one first fuel type.

The use of vegetable oils as biomass fuels offers ecological and economical advantages as compared with fossil fuels. Vegetable oils are obtained from renewable raw materials, which mean that during combustion they are essentially carbon dioxide neutral, free of sulfur and, as opposed to conventional fuels, biologically degradable. Furthermore, the discharge of particles during combustion is reduced drastically in comparison with diesel.

Due to the different chemical and physical fuel properties of vegetable oils as compared with diesel fuels or bio diesel, specially developed vegetable oil engines or modified series production diesel engines must be used in order to operate standard automobiles with vegetable oil. However, such a use of natural vegetable oil as a fuel causes considerable technical difficulties especially in modern series production direct fuel injection diesel engines.

Conventional fuel injection systems of nearly all standard series production diesel engines feature for example one fuel line or supply line from a fuel tank, in particular a diesel tank, to an injection system and one return line from the injection system back to the fuel tank. During operation for example of a series production diesel engine the volume flow in the circulation from the fuel tank through the injection system and back to the fuel tank is on average a multiple of the actual quantity of fuel used by the series production diesel engine per time unit. The fuel circulating thus in the injection system serves to lubricate the mechanical parts and also transports the operating heat out of the injection system. In many fuel injection systems the returning fuel is therefore used additionally to heat a fuel pre-filter, for example.

In new types of fuel injection systems with a radial piston pump and especially in systems with the "common rail" or "pump-nozzle" or "pump-line-nozzle" technology, on the other hand, the fuel circulating in the injection system is used especially for cooling. Due to mechanical work and the configuration of the components supplying the fuel, operation of such a fuel injection system results by principle in a thermal power of several kilowatts, which is compensated by means of the fuel circulation. Before returning to the fuel tank, the heated fuel frequently passes through a heat exchanger or return condenser. Such a return condenser maintains thermal stability in the injection system. Furthermore, gas bubbles that have formed in the fuel or inadvertently admitted air are continuously removed from the injection system by means of the return line.

For the use of fuels with more favorable properties for the injection and combustion in the engine at higher fuel temperatures, it has proven useful to bypass the fuel tank—wholly or partially—during the return of the fuel to the forward flow (short-circuit return). This process is used to influence the flow properties of fuels with highly temperature-dependent viscosity and can additionally be based on the gradient of the bubble-point curve, the ignition temperature or other chemical or physical properties. DE 197 36 283 describes a fuel supply system in which a return line to the tank is provided to protect the fuel from overheating based on its viscosity.

Furthermore, methods for operating an internal combustion engine with two separately stored fuel types, for example with diesel fuel and vegetable oil, are known, in which a diesel engine is supplied with either diesel fuel or heated vegetable oil depending on the temperature of the engine's cooling water. Such systems are referred to in the literature as 2-tank systems. DE 202 08 590, for example, describes a 2-tank system in which the fuel is heated by means of a cooling water-operated heat exchanger and an electric heating source, wherein the vegetable oil is preferably heated to 70° C. DE 38 00 585 likewise describes a temperature-dependent switching of the fuel supply for operating an internal combustion engine with two separate fuel types.

The now widespread direct fuel injection diesel engines have significantly higher operating requirements for the complete combustion of the injected fuel than is the case with pre-combustion chamber or whirl chamber diesel engines. In addition, the applicable and future emissions standards are a decisive factor in the design of new diesel engines and corresponding injection systems. Due to the current emissions standards it is necessary to keep the nitrogen oxide and soot emission levels of newly developed diesel engines as low as possible.

For this purpose, exhaust return flow systems are known in the art and are installed in a multitude of commercially available diesel vehicles. In such exhaust return flow systems a lower oxygen concentration is provided for the combustion process by mixing exhaust gas with the intake air. This avoids local peak temperatures during the combustion process, which contribute to the thermal formation of NO (Zeldovich NO). The goal of preventing nitrogen oxide is in direct conflict with the formation of soot, since the soot is not sufficiently oxidized at a low oxygen concentration.

A further measure for reducing the nitrogen oxide emissions is the controlled dynamic adjustment of the injection (at times also several injections per cycle) or of the start of supply to "retard", i.e. at a position of the piston before or after top dead center that is reached at a later point in time. The exhaust behavior can also be affected by the injection pressure. A lower injection pressure causes the formation of larger droplets, which in turn results in a higher soot content.

The technical design and the regulation of a fuel injection system are optimized for the use of regular diesel fuel in modern direction injection diesel engines. Exhaust return flow, retard, etc. are achieved for example by an electronic control during operation of the vehicle based on the current operating parameters and comparison values that are optimized for diesel operation. Now, if pure vegetable oil is used instead of diesel fuel, for example, such measures can frequently cause malfunctions or serious engine damage.

Current tests of corresponding conversion systems for the operation of series production diesel engines with vegetable oil have shown that serious problems occur especially with direct injection diesel engines, in particular with "common rail" and also "pump-nozzle" diesel engines. For example, the complete combustion of the vegetable oil is frequently not ensured under certain operating conditions, in particular during a cold start or when the diesel engine is operated under a moderate load. Such unfavorable operating conditions occur regularly and frequently especially with automobiles, commercial vehicles and agricultural machines. Possible consequences of incomplete combustion are the entry of unburned vegetable oil in the motor oil, resulting in the formation of clumps due to polymerization. This causes a breakdown in the lubrication system. In addition, changes in the injection nozzles ("coking") cause a defective injection pattern, which can result in serious damage to the piston heads, the piston rings and the valves.

Without internal modification to the engine, i.e. only with changes in the peripheral units of the engine and in the fuel supply system, such direct injection series production diesel engines cannot be converted for operation with pure vegetable oil with any appreciable degree of reliability, long-term stability and convenience, also taking into account regularly occurring unfavorable operating conditions.

Both for the cold start and the warm-up phase of such a diesel engine and during certain operating conditions, it has proven technically advantageous and desirable to supply the fuel injection system with pure diesel fuel, pure vegetable oil or a mixture of vegetable oil and diesel fuel. Even a small percentage of diesel fuel in a mixture with vegetable oil significantly reduces the viscosity of the diesel-vegetable oil mixture as compared with pure vegetable oil and generally also distinctly improves combustion in the internal combustion engine. For this purpose, a defined mixture ratio of the fuel mixture located in the fuel injection system based on the respective operating condition of the diesel engine is necessary.

Particularly during the starting process of a diesel engine it is necessary that the injected fuel be immediately ignitable and completely combustible. Especially during a cold start after being parked for an extended period and after cooling of the diesel engine accordingly, the fuel in the injection system should be replaced wholly or at least partially with diesel fuel. This process is referred to as "flushing" and preferably is also carried out before shutting off the engine, while the engine is still running. For this purpose, the diesel engine is supplied only with diesel fuel for a specified duration, which continuously increases the proportion of diesel in the fuel mixture in the injection system. Due to the design of the injection systems, flushing is essentially a dilution process and only to a small degree a displacement process. The proportion of vegetable oil in the overall quantity of fuel within the injection system during the flushing process can therefore be described in good approximation based on an exponential decay curve, which depends only on the supplied quantity of diesel fuel for a given injection system.

If the fuel or the fuel mixture is supplied as described above in a short-circuit return flow, the supplied quantity of diesel fuel corresponds exactly to the quantity of fuel injected into the combustion chambers. Knowledge of the consumption of the vehicle makes it possible to estimate the diesel concentration based on the distance traveled or the time that elapses after initiation of the flushing process. Typical distances for a "sufficient" flushing process are 5-10 km before shutting off the engine.

For the purpose of supplying diesel fuel more quickly, the flushing process can be implemented so that a return flow to the tank is ensured. Then the quantity of diesel supplied is determined not only based on consumption, but additionally by the quantity of fuel returning to the fuel tank. The latter is by far the dominating factor in this process.

A measurement of the time or distance after initiation of the flushing process does not allow for reliable information on the current mixture ratio of the fuel mixture in the injection system under otherwise non-constant external conditions.

The volume flow into the fuel tank corresponds to the volume pumped by the injection system and depends on a number of parameters. The exact determination of these parameters is not directly possible. At best, average values can be estimated over extended periods, by averaging the relevant parameters. A typical magnitude for the volume flow through a distributor injection pump during operation is for example approximately 60 liters per second. Therefore, a flushing process under suitable ambient parameters can be completed in less than one minute.

The exact determination of the percentage mixture ratio of the fuel types is not always necessary for this purpose. However, it is particularly important to be able to reliably determine a point in time for the flushing process at which a pre-determined mixture ratio has been reached during operation of the diesel engine, after the supply of fuel has been switched from one type to another. In addition, it is necessary to be able to set a selectable mixture ratio of the fuel types during operation and to be able to automatically maintain the set mixture ratio, without resulting in mixing of the fuels in the fuel tanks.

It is an object of the present invention therefore is to provide a method for verification of the presence of at least one given fuel mixture ratio, in order to enable, during operation of an internal combustion engine, the reliable verification of a given fuel mixture ratio and the setting and maintaining of this fuel mixture ratio and the determination of the load condition of an internal combustion engine.

SUMMARY OF THE INVENTION

An essential aspect of the method according to the invention rests in the fact that with the supply of a second fuel type or with the change from the supply of the first fuel type to the second fuel type, the fuel volume conveyed by the injection system is determined and dependent on the determined fuel volume, the presence of a preset resp. given fuel mixture ratio is verified. The advantage of measuring the conveyed fuel volume is that this measured quantity makes it possible to determine exactly the mixture ratio of the fuel mixture in the injection system, independent of the current operating parameters. This prevents not only insufficient flushing, but also excessive throughput of the diesel fuel used for the flushing process. The latter is no longer unmixed after the flushing process and therefore can no longer be used as flushing fuel.

It is particularly advantageous that the fuel mixture ratios in the injection system can be adjusted as needed. This enables, in all operating conditions for example of a series production diesel engine, the complete combustion of the vegetable oil (mixed with diesel), especially since the mixture ratio can be set as high as 100% free of vegetable oil. Damage resulting from the use of pure vegetable oil in operating conditions not suitable for such use are prevented by the use of such a fuel mixture.

In a preferred embodiment, a volume flow meter can be used in combination with solenoid valves controlled by a regulating unit to continuously verify and maintain a preset or given fuel mixture ratio depending on the fuel volume conveyed through the injection system.

Preferred further embodiments of the invention, in particular an apparatus for implementing the method described above, are the subject of the dependent claims.

BRIEF DESCRIPTION OF THE DRAWING

One exemplary embodiment of the invention is described below in more detail with reference to a schematic block diagram.

DETAILED DESCRIPTION OF THE INVENTION

Figure 1:
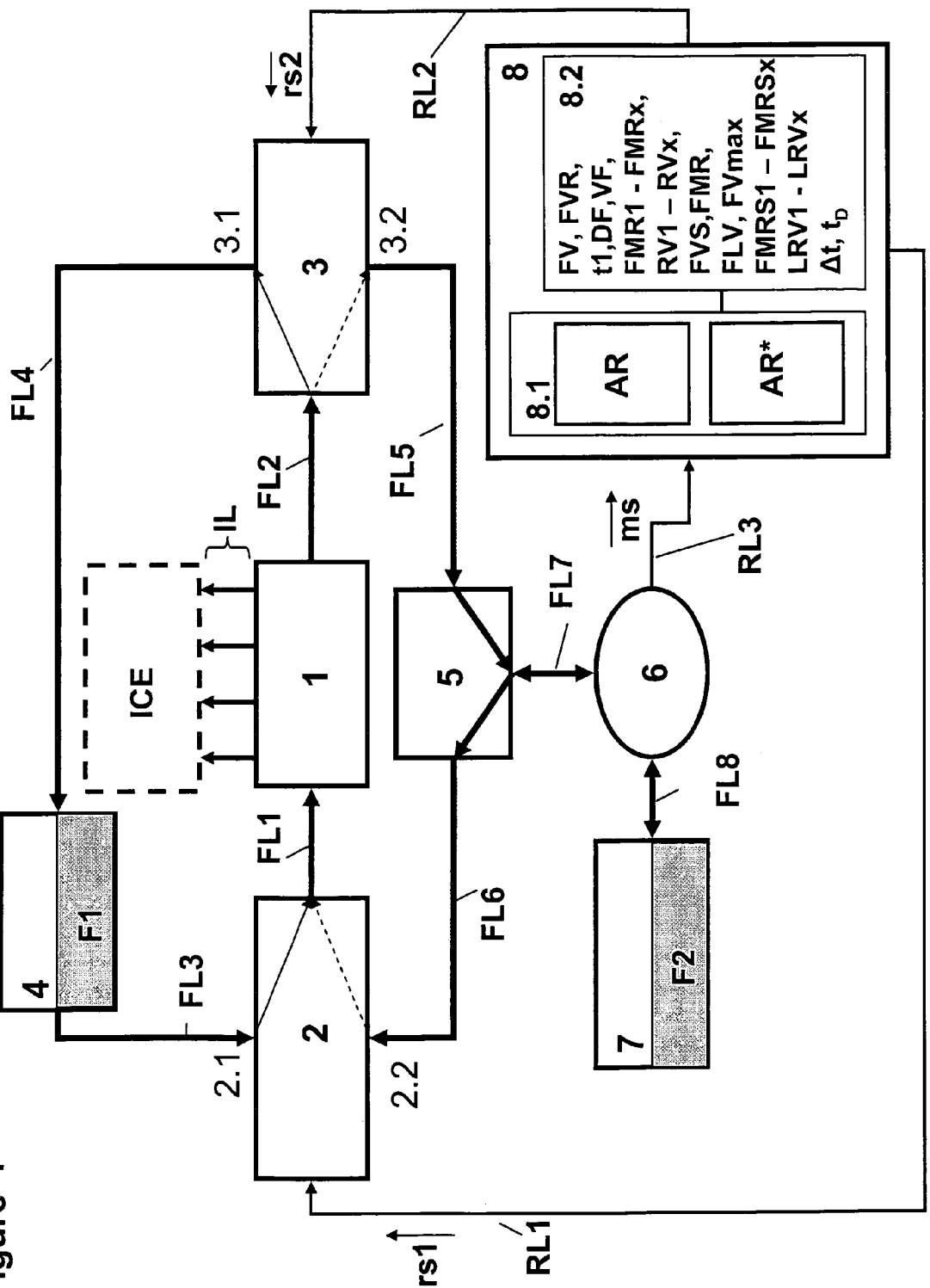
FIG. 1 shows by way of example in a schematic block diagram one injection system embodying the present invention.

FIG. 1 shows by way of example in a schematic block diagram one injection system 1, which is connected via several injection lines IL for example to an internal combustion engine ICE, into which at least one fuel type F1, F2 or one fuel mixture is injected. The injection system 1 is connected via a first fuel line FL1 with a forward flow valve 2 and via a second fuel line FL2 with a return flow valve 3. By way of example the forward flow valve and the return flow valve 2, 3 are designed as 3/2 way valves, which preferably can be implemented as electrically actuated solenoid valves.

The forward flow valve 2 is connected via a third fuel line FL3 to a first fuel tank 4, which is filled with the first fuel F1. In the present embodiment, the first fuel tank 4 is filled with diesel fuel as the first fuel F1. The diesel fuel circuit is completed by connecting the return flow valve 3 via a fourth fuel line FL4 with the first fuel tank 4.

The line leading from the forward flow valve 2 via the first fuel line FL1 to the injection system 1 frequently is referred to in the literature as the "injection pump flow" and the line leading from the injection system 1 via the second fuel line FL2 to the return valve 3 as the "injection pump return".

The return flow valve 3 is connected via a fifth fuel line FL5 with a T-element 5, which is connected via a sixth fuel line FL6 with the forward flow valve 2 and via a seventh fuel line FL7 with a volume flow meter 6, preferably an electronic volume flow meter with a turbine wheel design. The volume flow meter 6 is connected via an eighth fuel line FL8 to a second fuel tank 7. The second fuel tank 7 is filled with a second fuel type F2, preferably vegetable oil. As an alternative to the volume flow meter 6, a simple fill level indicator or at least a dosing pump—not depicted in the FIGURE—can be provided, which can be used to determine preset fill levels and therefore fluid volumes.

Furthermore, a regulating unit 8 is provided, which is connected via a first regulating line RL1 with the forward flow valve 2, via a second regulating line RL2 with the return flow valve 3 and via a third regulating line with the volume flow meter 6. The regulating unit 8 features a microprocessor unit 8.1 and a memory unit 8.2. An analysis routine AR is provided in the microprocessor unit 8.1, by means of which (analysis routine) the forward and return flow valves 2, 3 implemented as electronic solenoid valves can be switched and operating parameters can be measured by means of the volume flow meter 6 and stored in the memory unit 8.2.

In the following, with reference to the schematic block diagram depicted in the FIGURE, the various operating modes of the internal combustion engine ICE with diesel fuel as the first fuel type F1 and vegetable oil as the second fuel type F2 are explained in more detail For switching the supply of the first and/or second fuel F1, F2 into the injection system 1 the forward flow valve 2 and the return flow valve 3 both feature a first and second switch position 2.1, 2.2, 3.1, 3.2. In the first switch position 2.1 of the forward flow valve 2, the first fuel tank 4 is connected via the third and first fuel line FL3, FL1 with the injection system 1 for supplying the first fuel, for example diesel.

In the second switch position 2.2 of the forward flow valve 2, the switch position indicated in the FIGURE by a dashed line establishes the connection between the second fuel tank 7 via the eighth fuel line FL8, the volume flow meter 6, the seventh fuel line FL7, the T-element 5 and the sixth and first fuel line FL6, FL1 with the injection system 1. In the first switch position 3.1 the return flow valve 3 is connected via the second fuel line FL2 with the output of the injection system 1 and via the forth fuel line FL4 with one output of the first fuel tank 4. In the second switch position 3.2 of the return flow valve 3 (indicated by a dashed line in the FIGURE), the injection system 1 is connected via the return flow valve 3, the fifth fuel line FL5 with the T-element 5.

In diesel mode the forward flow valve 2 and the return flow valve 3 are both in the first switch position 2.1, 3.1, thus connecting the first fuel tank 4 via the third fuel line FL3 with the forward flow valve 2. The forward flow valve 2 is connected via the first fuel line FL1 with the injection system 1, which is connected via the second fuel line FL2 with the return flow valve 3. The return flow valve 3 completes the diesel circuit via the fourth fuel line FL4, which in turn is connected with the first fuel tank 4.

The depicted circuits ("solid lines") of the forward and return flow valves 2, 3 correspond, with a view toward the operating principle, to the standard operation of a non-modified injection system within a conventional direct fuel injection diesel engine.

When operated with vegetable oil, the supply of diesel fuel F1 is switched to the supply of vegetable oil F2. For this purpose, switching of both the forward flow valve 2 and the return flow valve 3 into the second switch position 2.2, 3.2 is controlled by means of the analysis routine AR provided in the regulating unit 8. This establishes the vegetable oil circuit ("short-circuit return") via the T-element 5 and the volume flow meter 6.

In the depicted embodiment the vegetable oil tank 7 and the volume flow meter 6 are connected only via the eighth fuel line FL8 and the volume flow meter 6 is connected with the T-element 5 via the seventh fuel line FL7 (single line operation). These seventh and eighth fuel lines FL7, FL8 are designed as bi-directional fuel lines FL7, FL8 and thus serve as forward and return flow for the vegetable oil F2 from and to the vegetable oil tank 7.

The described switch position corresponds to the dashed lines of the forward and return flow valves 2, 3. In vegetable oil mode only the fuel volume of vegetable oil F2 consumed in the internal combustion engine ICE is suctioned from the vegetable oil tank 7 and is supplied via the eighth fuel line FL8, the volume flow meter 6, the T-element 5, the sixth fuel line FL6, the forward flow valve 2 and the first fuel line to the injection system 1.

The fuel volume FV conveyed from the second fuel tank 7 is measured by the volume flow meter 6 and transmitted via the third regulating line RL3 to the electronic regulating unit 8 in the form of measuring signals ms. The received measuring signals ms are analyzed by the microprocessor unit 8.1 provided in the regulating unit 8 and stored in the memory unit 8.2 if applicable.

In order to replace the vegetable oil F2 present in the injection system 1 wholly or at least partially ("flushing process"), the forward flow valve 2 that is connected via the first regulating line RL1 with the regulating unit 8 is switched to the first switch position 2.1. The forward flow valve now connects the diesel tank 4 via the third and first fuel line FL3, FL1 with the injection system 1 and supplies diesel fuel F1 to the injection system 1. The return flow valve 3 is kept in the second position 3.2 when switching from vegetable oil mode to flushing mode/mixed mode. This causes the fuel volume FVR conveyed through the injection system 1 to be supplied via the T-element 5 and the volume flow meter 6 to the vegetable oil tank 7, since it cannot flow off via the T-element 5 and the sixth fuel line FL6 and the connected input of the forward flow valve 2, which is blocked.

The fuel volume FVR conveyed through the injection system 1 is measured by the volume flow meter 6 and transmitted to the regulating unit 8 based on measuring signals ms. It is advantageous that in a preferred embodiment, the fuel volume/fuel volume mixture consumed or burned in the injection system 1 can be included in the calculation of the fuel volume FVR conveyed through the injection system 1.

The flow direction DF and flow volume VF is measured by the volume flow meter 6 starting at a specified time t1, for example the time at which the forward flow valve 2 is switched from the second to the first switch position 2.2, 2.1, and transmitted via the third regulating line RL3 in the form of measuring signals ms to the regulating unit 8. In the microprocessor unit 8.1 of the regulating unit 8 the received measuring signals ms of the measured flow direction DF and of the measured flow volume VF are analyzed in order to determine the fuel volume FVR conveyed through the injection system 1.

For verification of the presence of a preset fuel mixture ratio FMR1 through FMRx, preset reference volumes RV1 through RVx are stored in the memory unit 8.2. Such a reference volume RV1 through RVx is allocated a fuel mixture ratio FMR1 through FMRx present in the injection system 1. Therefore, the presence of a preset fuel mixture ratio FMR1 through FMRx during operation of the internal combustion engine ICE can be verified based on the fuel volume FVR conveyed through the injection system 1 beginning at a starting time t1.

Moreover, the addition of vegetable oil F2 can be quantified by means of the direction of flow DF of the vegetable oil F2 from the vegetable oil tank 7 to or from the injection system 1 measured by the volume flow meter 6. The verification of a preset fuel mixture ratio FMR1 through FMRx in the injection system 1 during operation of the internal combustion engine ICE can be performed virtually continuously by means of the analysis routine AR executed in the microprocessor unit 8.1, which for example features a loop routine for this purpose.

To increase the verification accuracy of the analysis routine AR, a set of start values is stored in the memory unit 8.2, these values being estimated based on the physical dimensions of the injection system and on the known operating parameters of the injection pump, etc. The start values include for example the total fuel volume FVS contained in the injection system 1 at the start of addition of vegetable oil and the mixture ratio MRS at the start of the addition of vegetable oil.

During the flushing process the presence of a sufficient fuel mixture ratio is verified based on an individually configurable flushing volume FLV that is stored in the memory unit 8.2, defining the end of the flushing process. For this purpose, the fuel volume FVR conveyed from the initial starting time or from the start of flushing t1 through the injection system 1 and through the volume flow meter 6 is determined and compared with the defined flushing volume FLV by means of the analysis routine AR. If the two volumes FVR=FLV at least correspond, the flushing process is terminated in that the return flow valve 3 is switched back to the first switch position 3.1, thus being connected via the fourth fuel line FL4 with the diesel tank 4. The flushing process is then completed.

In addition, it is possible to set a preset fuel mixture ratio FMR1 through FMRx during the operation of the internal combustion engine ICE in order to adapt the viscosity of the fuel mixture and also to adapt the fuel combustion to heavy operating conditions. For example, a cycle with alternating vegetable oil and diesel operation can be repeated a number of times.

For this purpose, a flushing process is first initiated—as described above—based on a known fuel mixture ratio FMR, for example with a high vegetable oil content, wherein diesel fuel F1 is supplied to the injection system 1. The quantity of the supplied diesel fuel F1 can be achieved via a separate additional volume meter (not depicted in the FIGURE) provided in the supply line (third and first fuel line FL3, FL1), or the supplied diesel fuel volume FV can be determined for example based on the fuel volume FVR flowing off through the volume flow meter 6. The determined fuel volume FVR is compared analogously to the flushing process with a reference volume RV1 through RVx representing a preset fuel mixture ratio FMR1 through FMRx and the presence of a preset fuel mixture ratio FMR1 is verified based on the results of the comparison.

If the preset fuel mixture ratio FMR1 is reached, the system is again switched to pure vegetable oil mode, i.e. the forward flow valve 2 is switched to the second switch position 2.2 by means of the regulating unit 8. After switching the forward flow valve 2, a vegetable oil volume required for reaching the preset fuel mixture ratio FMR1 is supplied to the injection system through the volume flow meter 6 based on the flow direction DF and the flow volume VF, wherein the fuel volume FV consumed by the internal combustion engine is included in the calculation.

The presence of the preset fuel mixture ratio FMR1 is checked virtually continuously via the analysis routine AR based on the current conveyed fuel volume FVR. Once the vegetable oil volume required for reaching the preset fuel mixture ratio FMR1 is given, the mixing cycle begins anew and diesel fuel F2—analogous to the flushing process—is again conveyed into the injection system 1. Based on the described fuel mixture process it is possible to set a freely selectable and precisely definable fuel mixture ratio FMR1.

In a preferred embodiment the diesel fuel volume FV supplied to the injection system 1 is limited in the cycle of the addition of diesel so that the reverse flow of the fuel mixture from the injection system 1 into the vegetable oil tank 7 can be prevented. This prevents mixing of diesel with the vegetable oil F2 in the vegetable oil tank 7. For this purpose, for example, a maximum diesel fuel volume FVmax is specified, which maximally forces the vegetable oil volume present in the eighth fuel line FL8 and the seventh fuel line FL7 back into the vegetable oil tank.

Based on the described method, it is possible to set virtually any fuel mixture ratio FMR1 through FMRx of the first and second fuels F1, F2 in the injection system 1, without diesel fuel F1 reaching the vegetable oil tank 7.

In addition to determining a given fuel mixture ratio FMR1 through FMRx, the measuring signals ms can be analyzed in a further embodiment by means of an additional analysis routine AR* for determining the load condition of the internal combustion engine ICE. For this purpose, the conveyed fuel volume per time unit FVRT is determined by an additional analysis routine AR* in the microprocessor unit 8.1 based on the measuring signals ms. This volume can be determined by a variety of methods, for example the conveyed fuel volume FVR can be integrated over a specified duration $\Box t$, or the duration $t_D$ required for the flow of a specified load reference volume LVR1 through LVRx can be measured.

The load condition of the internal combustion engine ICE is defined approximately by the fuel consumption in the injection system 1 or by the fuel volume FVRT conveyed per time unit through the injection system 1, so that preset load reference volumes LVR1 through LVRx for the conveyed fuel volume per time unit FVRT are stored in the memory unit 8.2 for determining the load condition of the internal combustion engine ICE. In addition, corresponding set fuel mixture ratios FMRS1 through FMRSx dependant on the load condition are allocated in the memory unit 8.2 to the preset load reference volumes LVR1 through LVRx. The fuel mixture ratios FMR1 through FMRx corresponding to the set fuel mixture ratios FMRS1 through FMRSx can be set by means of the method described above for setting a given fuel mixture ratio FMR1 through FMRx.

In this process, which is analogous to the process described above, the approximate load condition of the internal combustion engine ICE is determined continuously during operation of the internal combustion engine ICE with vegetable oil based on the measured fuel volume per time unit FVRT and, dependent thereon, the fuel mixture ratio FMR1 through FMRx is adjusted.

The invention was described above based on one exemplary embodiment. It goes without saying that numerous modifications are possible without abandoning the underlying inventive idea on which the invention is based.

What is claimed is:

1. A method for verification of at least one given fuel mixture ratio in a fuel injection system during operation of an internal combustion engine with at least two separately stored fuel types,
   supplying the injection system with at least one first fuel type,
   determining fuel volume conveyed through the injection system but not combusted by the engine with a supply of a second fuel type or with a change from the supply of the first fuel type to the second fuel type, and
   verifying a presence of a given fuel mixture ratio by comparing the determined fuel volume conveyed through the injection system but not combusted by the engine with a reference volume representing a preset fuel mixture ratio.

2. The method according to claim 1, further comprising comparing the determined fuel volume with a reference volume representing a preset fuel mixture ratio for verification of a given fuel mixture ratio.

3. The method according to claim 1, further comprising determining the fuel volume of the second fuel type supplied to the injection system.

4. The method according to claim 1, further comprising determining fuel volume of the second fuel type supplied to the injection system minus the fuel volume consumed in the injection system.

5. The method according to claim 1, further comprising estimating a total fuel volume present in the injection system before an initial supply of the second fuel type or before the initial change from the first to the second fuel type.

6. The method according to claim 5, further comprising estimating a fuel mixture ratio of the total fuel volume present in the injection system before the initial supply of the second fuel type or before the initial change from the first to the second fuel type.

7. The method according to claim 1, further comprising determining fuel volumes by means of a volume flow meter, a fill level indicator, or at least one dosing pump.

8. The method according to claim 7, further comprising determining direction of flow and the flow volume of the fuel or fuel mixture conveyed through the volume flow meter, the fill lever indicator, or the at least one dosing pump.

9. The method according to claim 1, further comprising determining conveyed fuel volume starting at a starting time.

10. The method according to claim 9, wherein the starting time used is the time of supplying the second fuel type or the change from the first to the second fuel type.

11. The method according to claim 1, further comprising comparing fuel volume conveyed through the injection system with a preset flush volume and in the event that the determined fuel volume corresponds to or exceeds the preset flush volume, terminating the flushing process.

12. The method according to claim 7, further comprising continuously verifying and maintaining a preset fuel mixture ratio by alternately supplying the first and second fuel to the injection system by means of a regulating unit connected to the volume flow meter and forward flow and return flow valves controlled by said regulating unit.

13. The method according to claim 1, wherein the fuel volume of the first fuel supplied in flushing or mixing mode is kept below a maximum fuel volume defined by the injection system parameters.

14. An apparatus for verification of at least one given fuel mixture ratio in a fuel injection system, comprising
   an internal combustion engine and
   an injection system connected to said internal combustion engine, a first fuel tank and a second fuel tank
   wherein the injection system is connected via fuel lines with the a first and second fuel tank,
      an intake of the injection system is connected via a forward flow valve unit and an output of the injection system is connected via a return flow valve unit,
   a fuel line extending from the return flow valve unit and the forward flow valve unit, said fuel line receiving fuel conveyed through the injection system but not combusted by the engine and
   a volume flow meter connected to said fuel line.

15. The apparatus according to claim 14, wherein a regulating unit is provided for switching the forward flow valve unit and the return flow valve unit from a first switch position to a second switch position.

16. The apparatus according to claim 15, wherein the regulating unit features a microprocessor unit and a memory unit.

17. The apparatus according to claim 15, wherein the regulating unit is connected via regulating lines with the forward flow valve unit, the return flow valve unit and the volume flow meter.

18. The apparatus according to claim 14, further comprising a T-element in said fuel line, said volume flow meter connected to said T element.

19. A method for verification of at least one given fuel mixture ratio in a fuel injection system for determining a load condition of an internal combustion engine with at least two separately stored fuel types, wherein the injection system provides fuel to said engine by a first path and to a fuel line exiting said injection system by a second path, the injection system is supplied with at least one first fuel type, wherein
   with a supply of a second fuel type or with the change from the supply of the first fuel type to the second fuel type, a fuel volume conveyed per time unit by the injection system to the fuel line exiting the injection system by said second path is determined and depending on the determined fuel volume per time unit, a presence of a given fuel mixture ratio is verified for defining the load condition of the internal combustion engine.

20. The method according to claim 18, wherein the duration required for conveying a preset load reference volume through the injection system is measured and, based on the measured duration the load condition of the internal combustion engine is determined approximately.

* * * * *